United States Patent
Khambete et al.

(10) Patent No.: US 6,631,785 B2
(45) Date of Patent: Oct. 14, 2003

(54) SOUND ATTENUATING COMPOSITE ARTICLES INCORPORATING SCRIM MATERIAL AND METHODS OF MAKING SAME

(75) Inventors: Surendra Khambete, West Bloomfield, MI (US); Fred Skidmore, Marion, NC (US); Melvyn J. Care, Kitchenor (CA); Chris Griffen, Canton, MI (US)

(73) Assignee: Collins & Aikman Products Co., Troy, MI (US)

( * ) Notice: Subject to any disclaimer, the term of this patent is extended or adjusted under 35 U.S.C. 154(b) by 104 days.

(21) Appl. No.: 10/028,192

(22) Filed: Dec. 20, 2001

(65) Prior Publication Data

US 2003/0116379 A1 Jun. 26, 2003

(51) Int. Cl.⁷ .............................. E04B 1/82; E04B 2/02; E04B 1/84; B62D 33/00
(52) U.S. Cl. ................. 181/290; 181/294; 181/286; 181/204; 296/39.3
(58) Field of Search ................................. 181/290, 294, 181/286, 287, 284, 288, 204, 210, 205; 52/144, 145; 296/39.3, 39.1

(56) References Cited

U.S. PATENT DOCUMENTS

| | | | | |
|---|---|---|---|---|
| 4,529,639 A | * | 7/1985 | Peoples et al. | 428/95 |
| 4,579,764 A | * | 4/1986 | Peoples et al. | 428/95 |
| 4,851,283 A | * | 7/1989 | Holtrop et al. | 442/370 |
| 5,094,318 A | | 3/1992 | Maeda et al. | 181/290 |
| 5,186,996 A | * | 2/1993 | Alts | 428/72 |
| 5,298,694 A | * | 3/1994 | Thompson et al. | 181/286 |
| 5,438,806 A | | 8/1995 | Reinhall | 52/167.1 |
| 5,493,081 A | * | 2/1996 | Manigold | 181/286 |
| 5,504,282 A | * | 4/1996 | Pizzirusso et al. | 181/290 |
| 5,554,830 A | * | 9/1996 | Muller et al. | 181/290 |
| 5,677,027 A | * | 10/1997 | Masuda et al. | 428/96 |
| 5,817,408 A | * | 10/1998 | Orimo et al. | 428/218 |
| 6,109,389 A | * | 8/2000 | Hiers et al. | 181/290 |
| 6,145,617 A | * | 11/2000 | Alts | 181/290 |
| 6,159,877 A | | 12/2000 | Scholz et al. | 442/103 |
| 6,296,075 B1 | * | 10/2001 | Gish et al. | 181/290 |
| 2003/0066708 A1 | * | 4/2003 | Allison et al. | 181/290 |

* cited by examiner

Primary Examiner—Robert E. Nappi
Assistant Examiner—Edgardo San Martin
(74) Attorney, Agent, or Firm—Myers Bigel Sibley & Sajovec

(57) ABSTRACT

Sound attenuating composite articles for use within vehicles as floor coverings and other interior trim components are provided. A sound attenuating composite article includes a damping layer, decoupler layer, scrim/web layer, and a porous upholstery material sandwiched together. The damping layer has a thickness of less than about 5 mm and is configured to be attached to a surface of a panel of a vehicle (e.g., a sheet metal or polymeric component of a vehicle, such as a floor panel, door panel, etc.) in face-to-face contacting relationship therewith. The decoupler layer has a thickness of less than about 70 mm and is attached to a surface of the damping layer in face-to-face contacting relationship. The scrim/web layer has a thickness of less than or equal to about two millimeters (2 mm). The porous upholstery material (e.g., carpeting) is attached to a surface of the scrim/web layer of material in face-to-face contacting relationship therewith.

57 Claims, 2 Drawing Sheets

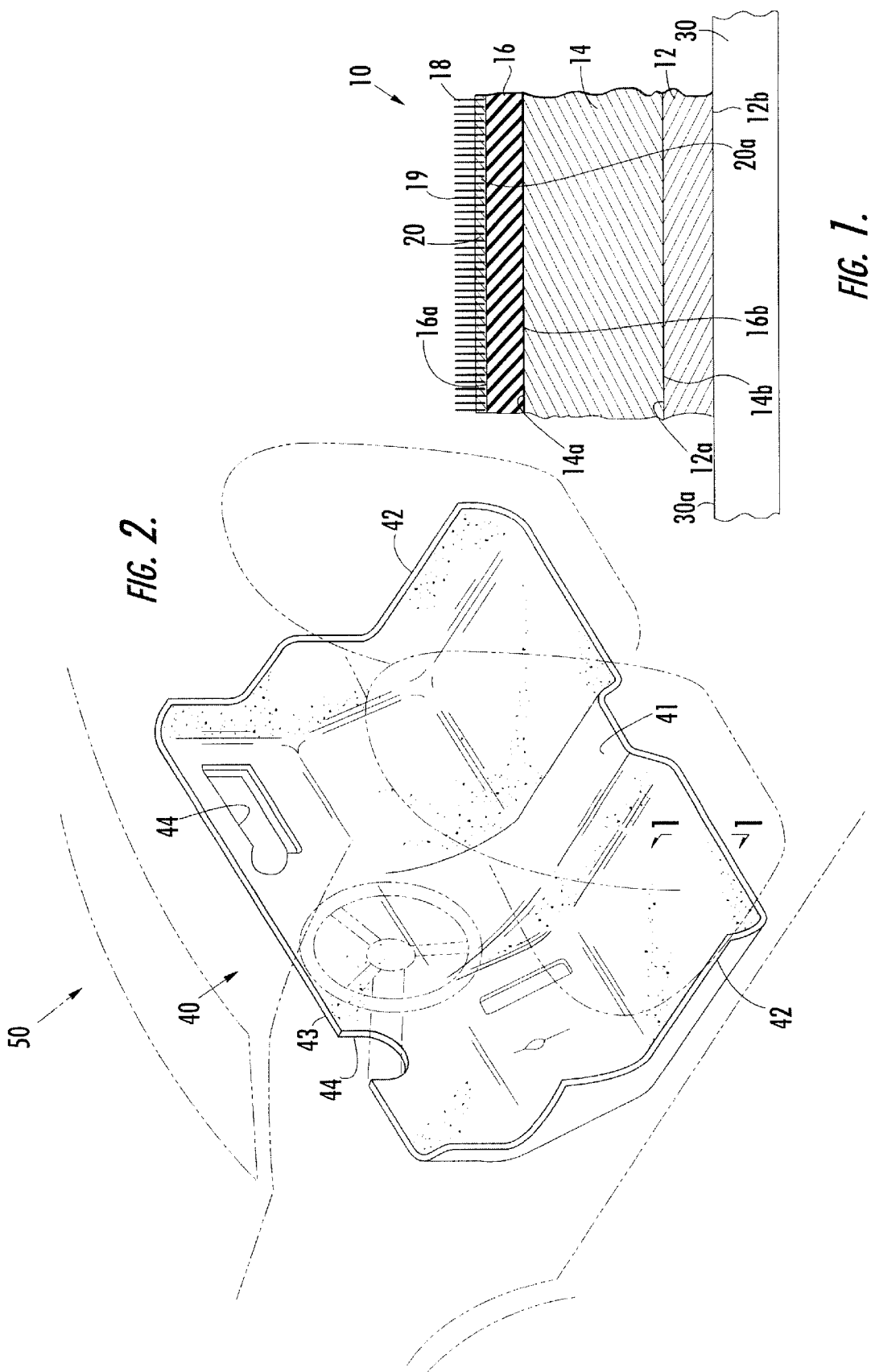

SOUND ATTENUATING COMPOSITE ARTICLES INCORPORATING SCRIM MATERIAL AND METHODS OF MAKING SAME

FIELD OF THE INVENTION

The present invention relates generally to vehicles and, more particularly, to sound attenuating materials utilized within vehicles.

BACKGROUND OF THE INVENTION

It is generally considered desirable to reduce the level of noise within a vehicle passenger compartment. External noises, such as road noise, wind noise, engine noise, vibrations, etc., as well as noises emanating from within passenger compartments, may be attenuated through the use of various acoustical materials. For example, sound attenuating materials are conventionally provided in conjunction with carpeting for floor panels, upholstery for door panels and headliners, etc.

The attenuation of external noise is conventionally referred to as sound transmission loss (STL). The attenuation of internal noise is conventionally referred to as sound absorption. The acoustic impedance of a material is defined as material density times acoustic velocity, and is expressed in units of Rayls (Newton-seconds/meter$^3$). Acoustic impedance measures material resistance to air moving through the material as a function of frequency. (In contrast, static air flow resistance Rayl measurements are independent of frequency.) Thus, for fibrous materials, acoustic impedance depends upon the density of the fibrous material, fiber diameter, thickness and related parameters. Generally, the greater the blanket density and the finer the fibers, the higher the acoustic impedance. Moreover, thicker increase acoustic impedance. The ability of a material to attenuate noise is conventionally defined by the material's STL, acoustic impedance, and absorption characteristics.

Various sound attenuating materials have been developed for use in reducing noise levels within passenger compartments of vehicles. For example, U.S. Pat. No. 4,851,283 to Holtrop et al., proposes a thermoformable laminate for use in headliners. The headliner comprises a non-woven fabric bonded to a foamed polymer sheet. The fabric is formed from a blend of low melting staple fibers and high melting staple fibers.

U.S. Pat. No. 5,298,694 to Thompson proposes a non-woven acoustical insulation web. The web comprises thermoplastic fibers, and particularly a blend of melt-blown microfibers and crimped bulking fibers.

U.S. Pat. No. 5,677,027 to Masuda et al., proposes a sound insulating structure comprising a covering layer, a panel, and a cushioning layer. The cushioning layer comprises a first fiber such as polyethylene terephthalate (PET) and a second fiber that is of a shell-core construction wherein the majority of the core is PET.

U.S. Pat. No. 5,817,408 to Orimo et al., proposes a sound insulating structure which includes low and high density thermoplastic fibers. PET is preferred as a thermoplastic synthetic fiber.

U.S. Pat. No. 4,529,639 to Peoples, Jr. et al. proposes a molded foam-backed carpet assembly which includes a carpet layer, a moldable thermoplastic polymer layer and one or more foam pads fusibly bonded to the thermoplastic layer and extending over less than the entire surface of the thermoplastic polymer layer to provide desired cushioning and sound and thermal insulation only in preselected areas of the carpet.

In general, the ability of conventional materials to attenuate sound increases as the amount of material increases. Unfortunately, increasing the amount of material often increases the weight of sound attenuating material, which may be undesirable. Accordingly, there is a continuing need for acoustical insulation materials for use within vehicles that exhibit superior sound attenuating properties, while also being lightweight and low in cost.

SUMMARY OF THE INVENTION

In view of the above discussion, sound attenuating composite articles for use within vehicles as floor coverings and other interior trim components are provided. According to embodiments of the present invention, a sound attenuating composite article includes first, second, and third layers of material and a porous upholstery material (e.g., carpeting) sandwiched together. The composite article is configured to have an acoustic impedance of between 4,700–6,300 Rayls in the frequency range of 100–400 Hz; an acoustic impedance of between 1,300–2,400 Rayls in the frequency range of 500–2,000 Hz; and an acoustic impedance of between 950–1,600 Rayls in the frequency range of 2,500–5,000 Hz. The composite article is also configured to have a sound absorption factor of between 0.13–0.18 in the frequency range of 100–400 Hz; a sound absorption factor of between 0.55–0.69 in the frequency range of 500–2,000 Hz; and a sound absorption factor of between 0.69–0.87 in the frequency range of 2,500–5,000 Hz. In addition, the composite article is configured to have a sound transmission loss of between 7.3–14.0 decibels (dB) in the frequency range of 100–400 Hz; a sound transmission loss of between 6.6–11.9 dB in the frequency range of 500–2,000 Hz; and sound transmission loss of between 8.0–15.0 dB in the frequency range of 2,500–5,000 Hz.

The first layer of material is a damping layer that has a thickness of less than or equal to about five millimeters (5 mm) and is configured to be attached to a surface of a panel of a vehicle (e.g., a sheet metal or polymeric component of a vehicle, such as a floor panel, door panel, etc.) in face-to-face contacting relationship therewith. The second layer of material is a decoupler layer that is attached to a surface of the first layer of material in face-to-face contacting relationship. The second layer of material has a thickness of less than or equal to about seventy millimeters (70 mm). The third layer of material is a scrim/web material that is attached to a surface of the second layer of material in face-to-face contacting relationship. The third layer of material has a thickness of less than or equal to about two millimeters (2 mm). The porous upholstery material (e.g., carpeting) is attached to a surface of the third layer of material in face-to-face contacting relationship therewith.

According to embodiments of the present invention, the damping layer is formed from bituminous material such as asphalt or asphalt modified with resins and/or polymers. The decoupler layer comprises an acoustic fiber batting and/or an acoustic foam material. The third layer of material is a scrim/web material. An exemplary scrim material is a blend of polyester and polyolefin fibers, preferably a blend of about 70% polyester fibers and about 10% polyolefin fibers.

Methods of producing sound attenuating composite articles for use within vehicles are also provided. According to embodiments of the present invention a damping layer having a thickness of less than or equal to about 5 mm is provided. Typical range of composite loss factor for the damping layer is between about 0.01 and 0.06 (as measured by the oberst method between −30° C. and 70° C.). A decoupler layer having a thickness of less than or equal to about 70 mm is provided that has an acoustic impedance of at least 5,300 Rayls, 1,160 Rayls, and 190 Rayls in the respective frequency ranges of 100–400 Hz, 500–2,000 Hz, and 2,500–5,000 Hz; has a sound absorption factor of at least 0.01, 0.27, and 0.72 in the respective frequency ranges of 100–400 Hz, 500–2,000 Hz, and 2,500–5,000 Hz; and has a sound transmission loss of at least 1.3 dB, 1.8 dB, and 2.8 dB in the respective frequency ranges of 100–400 Hz, 500–2,000 Hz, and 2,500–5,000 Hz. The decoupler layer is attached to a surface of the damping layer of material in face-to-face contacting relationship therewith.

A third layer of material having a thickness of less than or equal to about 2 mm is attached to a surface of the decoupler layer in face-to-face contacting relationship therewith. The third layer of material is a scrim/web material having a woven, non-woven, or melt blown construction which could be composed entirely of (or a blend of) nylon, polyester and polyolefin fibers. The third layer of material may be adhesively attached to the decoupler layer, or may be attached via mechanical fasteners or via other attachment means know to those skilled in the art.

The third layer of material has an acoustic impedance of at least 41,000 Rayls, 7,000 Rayls, and 1,900 Rayls in the respective frequency ranges of 100–400 Hz, 500–2,000 Hz, and 2,500–5,000 Hz; has a sound absorption factor of at least 0.00, 0.001, and 0.13 in the respective frequency ranges of 100–400 Hz, 500–2,000 Hz, and 2,500–5,000 Hz; and has a sound transmission loss of at least 1.9 dB, 1.5 dB, and 1.7 dB in the respective frequency ranges of 100–400 Hz, 500–2,000 Hz, and 2,500–5,000 Hz.

Porous upholstery material, such as carpeting, is then attached to a surface of the third layer of material in face-to-face contacting relationship therewith. In the case of carpeting, the backing side of the carpeting is attached to the surface of the second layer of material. Various additional operations may be performed on the composite article including molding operations, trim operations, etc.

Composite articles according to embodiments of the present invention can provide desired sound attenuation properties in selected vehicle locations, such as floor pans, door panels, etc. Moreover, composite articles according to embodiments of the present invention may have reduced overall weight without sacrificing sound attenuation properties.

BRIEF DESCRIPTION OF THE DRAWINGS

The accompanying drawings, which form a part of the specification, illustrate key embodiments of the present invention. The drawings and description together serve to fully explain the invention.

FIG. 1 is cross-sectional view of a sound attenuating composite article according to embodiments of the present invention.

FIG. 2 is a perspective view of an exemplary molded floor covering assembly for a vehicle that is formed from the sound attenuating composite article of FIG. 1, according to embodiments of the present invention.

DETAILED DESCRIPTION OF THE INVENTION

Figure 3:
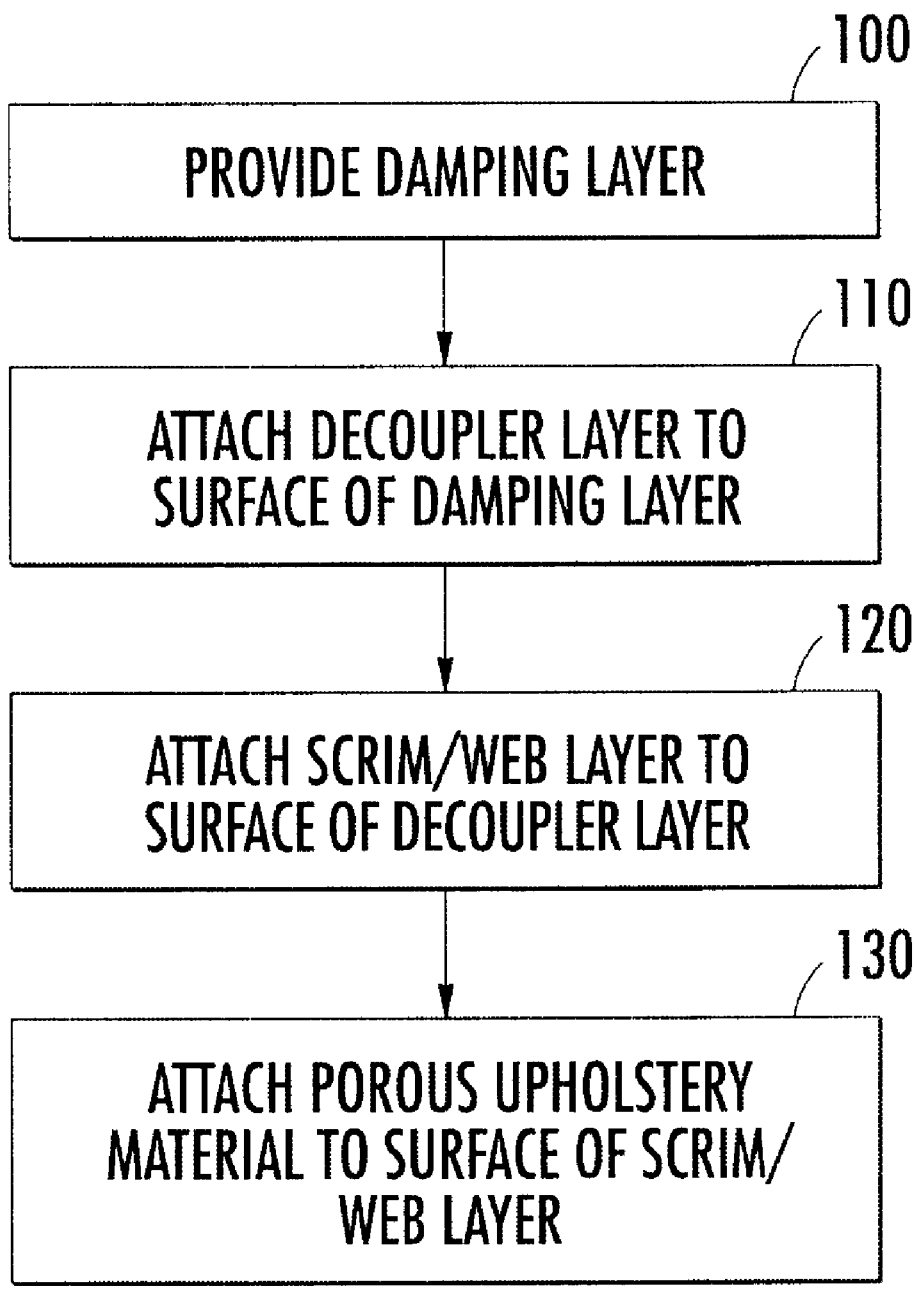
FIG. 3 is a flowchart of operations for producing the sound attenuating composite article of FIG. 1, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

Embodiments of the present invention provide sound attenuating composite articles for use in various applications, particularly automotive applications. Exemplary automotive applications within which sound attenuating composite articles according to embodiments of the present invention may be utilized include, but are not limited to, floor coverings, door panels, and other interior portions, as well as upholstery for various interior portions, such as headliners, dashboards, etc.

Referring to FIG. 1, a sound attenuating composite article 10 for use within a vehicle that is configured to attenuate noise (both internal and external to the vehicle) is illustrated. The illustrated sound attenuating composite article 10 includes first (damping), second (decoupler) and third (scrim/web) layers of material 12, 14, 16, and a porous upholstery material 18 (e.g., carpeting) sandwiched together.

The composite article is configured to have an acoustic impedance of between 4,700–6,300 Rayls in the frequency range of 100–400 Hz; an acoustic impedance of between 1,300–2,400 Rayls in the frequency range of 500–2,000 Hz; and an acoustic impedance of between 950–1,600 Rayls in the respective frequency range of 2,500–5,000 Hz.

The composite article is configured to have a sound absorption factor of between 0.13–0.18 in the frequency range of 100–400 Hz; a sound absorption factor of between 0.55–0.69 in the frequency range of 500–2,000 Hz; and a sound absorption factor of between 0.69–0.87 in the frequency range of 2,500–5,000 Hz. As is known to those skilled in the art, an absorption factor is a dimensionless number that can have values between 0.0 and 1.0. A value of 0.5 means that fifty percent (50%) of the incident sound is absorbed within the material and that fifty percent (50%) of the incident sound is reflected.

In addition, the composite article is configured to have a sound transmission loss of between 7.3–14.0 decibels (dB) in the frequency range of 100–400 Hz; a sound transmission loss of between 6.6–11.9 dB in the frequency range of 500–2,000 Hz; and sound transmission loss of between 8.0–15.0 dB in the frequency range of 2,500–5,000 Hz. As is known to those skilled in the art, the ratio of sound incident on one side of a layer of material to that radiated from the other side is used to calculate the sound transmission loss in dB. Sound transmission loss usually increases with the frequency of the incident sound.

The first (damping) layer of material 12 includes opposite surfaces 12a, 12b and is attached to a surface 30a of a panel 30 of a vehicle (e.g., a sheet metal or polymeric component of a vehicle, such as a floor panel, door panel, etc.) such that surfaces 12b and 30a are in face-to-face contacting relationship. The first layer of material 12 may be attached to the panel 30 in various ways without limitation. For example, the first layer of material 12 may be attached to the panel 30 via adhesive(s) and/or via mechanical fastening devices, such as rivets, bolts, screws, snaps, etc. In some applications, depending on vehicle and cost requirements, a damping layer may not be required.

Vehicle panels to which sound attenuating composite articles according to the present invention may be attached may have various shapes, configurations, and sizes, and may be formed of various materials including, but not limited to metals, polymers, and combinations thereof. For example, a vehicle panel may be sheet metal having a three-dimensional configuration. Alternatively, a vehicle panel may be a substantially flat piece of sheet metal.

The second (decoupler) layer of material 14 includes opposite surfaces 14a, 14b and is attached to a surface 12a of the first layer of material 12 such that surfaces 12a and 14b are in face-to-face contacting relationship. The second layer of material 14 has a thickness of less than or equal to about 70 mm. The second layer of material 14 may be attached to the first layer of material 12 in various ways without limitation. For example, the first and second layers of material 12, 14 may be adhesively attached together and/or may be fused together via temperature and/or pressure using known techniques. According to alternative embodiments of the present invention, the first layer of material 12 may be directly attached to a vehicle panel 30 and the remainder of the composite article 10 (i.e., second layer 14, third layer 16, porous upholstery material 18) may be configured to overlie the first layer of material 12.

The third (scrim/web) layer of material 16 includes opposite surfaces 16a, 16b and is attached to a surface 14a of the second layer of material 14 such that surfaces 14a and 16b are in face-to-face contacting relationship. The third layer of material 16 has a thickness of less than or equal to about 2 mm. The third layer of material 14 may be attached to the second layer of material 12 in various ways without limitation. For example, the second and third layers of material 14, 16 may be adhesively attached together and/or may be fused together via temperature and/or pressure using known techniques.

According to alternative embodiments of the present invention, the first (damping) layer of material 12 may be directly attached to a vehicle panel 30 and the remainder of the composite article 10 (i.e., second layer 14, third layer 16, porous upholstery material 18) may be configured to overlie the first layer of material 12.

The porous upholstery material 18 is attached to a surface 16a of the third layer of material 16 in face-to-face contacting relationship therewith. In the illustrated embodiment, the porous upholstery material 18 is carpeting and includes a fabric side 19 and an opposite backing side 20. A surface 20a of the backing side 20 is attached to a surface 16a of the third layer of material 16 in face-to-face contacting relationship therewith, as illustrated. The porous upholstery 18 may be attached to the third layer of material 16 in various ways without limitation. For example, the porous upholstery 18 and third layer of material 16 may be adhesively attached together and/or may be fused together via temperature and/or pressure using known techniques.

According to embodiments of the present invention, the first (damping) layer of material 12 is formed from bituminous materials such as asphalt or asphalt modified with resins and/or polymers.

According to embodiments of the present invention, the second (decoupler) layer of material 14 may be formed from either an acoustic fiber batting and/or an acoustic foam material. Various types of synthetic fibers, natural fibers, and/or blends thereof may be utilized. In addition, various types of open celled foams may be utilized. Exemplary batting materials may include, but are not limited to, densified polyester batting and needled polyester batting. Exemplary foams may include, but are not limited to, gel coats, latex, sheet urethane foam, polyethylene or EVA (ethylene vinyl acetate) foam. The second layer of material 14 may have a density of between about 400 and about 1,200 grams per square meter according to embodiments of the present invention. The second layer of material 14 may be a low mass, low cost material. Structurally, the second layer of material 14 may be an elastic or inelastic material. The second layer of material 14 acts as a spacer layer to maintain the third layer of material 16 a predetermined distance from the first layer of material 12. Thickness of the second layer of material 14 may be between about 5 mm and about 70 mm, with a preferred thickness range of between about 5 mm and about 30 mm.

According to embodiments of the present invention, the first layer of material 12 having a thickness of less than or equal to about 5 mm will have a range of composite loss factor between about 0.01 and about 0.06 (as measured by the oberst method between about −30° C. and about 70° C.).

According to embodiments of the present invention, the second layer of material 14 is configured to have an acoustic impedance of between 5,300–5,500 Rayls in the frequency range of 100–400 Hz; an acoustic impedance of between 1,160–1,180 Rayls in the frequency range of 500–2,000 Hz; and an acoustic impedance of between 190–325 Rayls in the respective frequency range of 2,500–5,000 Hz.

According to embodiments of the present invention, the second layer of material 14 is configured to have a sound absorption factor of between 0.01–0.03 in the frequency range of 100–400 Hz; a sound absorption factor of between 0.27–0.37 in the frequency range of 500–2,000 Hz; and a sound absorption factor of between 0.72–0.92 in the frequency range of 2,500–5,000 Hz.

According to embodiments of the present invention, the second layer of material 14 is configured to have a sound transmission loss of between 1.3–3.40 dB in the frequency range of 100–400 Hz; a sound transmission loss of between 1.8–3.6 dB in the frequency range of 500–2,000 Hz; and a sound transmission loss of between 2.8–5.1 dB in the frequency range of 2,500–5,000 Hz.

According to embodiments of the present invention, the third layer of material 16 is a scrim material having a melt blown, woven or non-woven blend of nylon, polyester and polyolefin fibers. A suitable scrim material is THINSULATE® brand insulation, available from Minnesota Mining & Manufacturing Co., St. Paul, Minn.

According to embodiments of the present invention, the third of material 16 has a thickness of less than or equal to about two millimeters (2 mm). The third layer of material 16 preferably has a density of between about 1 and 1.5 Kg/m$^2$. The third layer of material 16 may be moldable with the upholstery (e.g., carpeting) 18.

According to other embodiments of the present invention, the third layer of material 16 may be a spun bonded polyester fiber product (polyester matrix fiber) ranging from about seventeen grams per square meter to about ninety grams per square meter (17–90 g/m²) and having a low melt polyester binder of between about seven percent and about seventeen percent (7–17%). Such a material is available from the Frudenberg Nonwovens Group, Durham, N.C.

According to other embodiments of the present invention, the third layer of material 16 may be a spun laced product ranging in weight from about twenty grams per square meter to about ninety grams per square meter (20–90 g/m²). Such a material has a low melt nylon binder and a high melt polyester matrix fiber (polyester fiber with low melt nylon sheath; nylon content between about eighteen percent and about twenty two percent (18–22%) of total material weight). Such a material is available from Colbond, Inc., Enka, N.C.

According to other embodiments of the present invention, the third layer of material 16 may be a waste type product referred to as "shoddy" and may contain a wide variety of fibers, both natural and synthetic. Such a material can be needled or densified using a low melt binder fiber and heat.

According to other embodiments of the present invention, the third layer of material 16 may contain a variety of materials other than fiber such as foam, fabric, etc. Typical weight ranges for such a material may be from about six ounces per square yard to about thirty ounces per square yard (6–30 oz/yd²). Materials of this type are available from Jamesville-Sackner Group, Norwalk, Ohio.

According to embodiments of the present invention, the third layer of material 16 is configured to have an acoustic impedance of between 41,000–48,000 Rayls in the frequency range of 100–400 Hz; an acoustic impedance of between 7,000–7,500 Rayls in the frequency range of 500–2,000 Hz; and an acoustic impedance of between 1,900–2,100 Rayls in the respective frequency range of 2,500–5,000 Hz.

According to embodiments of the present invention, the third layer of material 16 is configured to have a sound absorption factor of between 0.0–0.001 in the frequency range of 100–400 Hz; a sound absorption factor of between 0.001–0.018 in the frequency range of 500–2,000 Hz; and a sound absorption factor of between 0.13–0.14 in the frequency range of 2,500–5,000 Hz.

According to embodiments of the present invention, the third layer of material 16 is configured to have a sound transmission loss of between 1.9–6.50 dB in the frequency range of 100–400 Hz; a sound transmission loss of between 1.5–4.7 dB in the frequency range of 500–2,000 Hz; and a sound transmission loss of between 1.7–4.2 dB in the frequency range of 2,500–5,000 Hz.

According to embodiments of the present invention, the second layer of material 14 and the third layer of material 16, when in face-to-face contacting relationship with each other, have a combined acoustic impedance of between 4,900–5,500 Rayls in the frequency range of 100–400 Hz; an acoustic impedance of between 1,200–1,500 Rayls in the frequency range of 500–2,000 Hz; and an acoustic impedance of between 550–870 Rayls in the respective frequency range of 2,500–5,000 Hz.

According to embodiments of the present invention, the second layer of material 14 and the third layer of material 16, when in face-to-face contacting relationship with each other, have a combined sound absorption factor of between 0.05–0.09 in the frequency range of 100–400 Hz; a sound absorption factor of between 0.56–0.63 in the frequency range of 500–2,000 Hz; and a sound absorption factor of between 0.89–0.96 in the frequency range of 2,500–5,000 Hz.

According to embodiments of the present invention, the second layer of material 14 and the third layer of material 16, when in face-to-face contacting relationship with each other, have a combined sound transmission loss of between 5.0–8.0 dB in the frequency range of 100–400 Hz; a sound transmission loss of between 4.8–7.3 dB in the frequency range of 500–2,000 Hz; and a sound transmission loss of between 6.5–9.0 dB in the frequency range of 2,500–5,000 Hz.

Referring to FIG. 2, reference character 40 generally indicates a vehicle floor covering formed from the sound attenuating composite article 10 of FIG. 1. The illustrated floor covering 40 has a non-planar three dimensional molded configuration adapted to fit the front seat compartment floor of a vehicle 50 and includes a raised medial portion 41 adapted to conform to the transmission hump, generally vertically extending side portions 42 adapted to fit beneath each door opening, and a front portion 43 adapted to fit along the inclined floorboard and vertical firewall areas of the vehicle 50. Various openings or cut-outs are provided, as indicated at 44, to receive air conditioning equipment, the steering column, pedals and the like. It is to be understood that the particular three dimensional configuration illustrated is merely for purposes of illustration. Vehicle floor coverings (as well as other vehicle trim components) formed from sound attenuating composite articles according to embodiments of the present invention may have various configurations and shapes without limitation.

Referring to FIG. 3, a method of producing a composite article for use within a vehicle to attenuate noise (from both external and internal noise sources), according to embodiments of the present invention, is illustrated. A damping layer is provided (Block 100). As described above, the damping layer comprises bituminous material and has a thickness of less than about 5 mm and has a range of composite loss factor between about 0.01 and about 0.06 (as measured by the oberst method between about −30° C. and about 70° C.).

A decoupler layer having a thickness of less than or equal to about 70 mm is attached to a surface of the damping layer in face-to-face contacting relationship therewith (Block 110). As described above, the decoupler layer according to embodiments of the present invention has an acoustic impedance of at least 5,300 Rayls, 1,160 Rayls, and 190 Rayls in the respective frequency ranges of 100–400 Hz, 500–2,000 Hz, and 2,500–5,000 Hz; has a sound absorption factor of at least 0.01, 0.27, and 0.72 in the respective frequency ranges of 100–400 Hz, 500–2,000 Hz, and 2,500–5,000 Hz; and has a sound transmission loss of at least 1.3 dB, 1.8 dB, and 2.8 dB in the respective frequency ranges of 100–400 Hz, 500–2000 Hz, and 2,500–5,000 Hz. As described above, the decoupler layer may be an acoustic fiber batting and/or an acoustic foam material. Various types of synthetic fibers, natural fibers, and/or blends thereof may be utilized. In addition, various types of foams may be utilized.

A third layer of material having a thickness of less than or equal to about 2 mm is attached to a surface of the decoupler layer in face-to-face contacting relationship therewith (Block 120). The third layer of material is a scrim/web material having a woven or non-woven blend of polyester and polyolefin fibers, and preferably a blend of about 70% polyester fibers and about 10% polyolefin fibers. The third layer of material may be adhesively attached to the decoupler layer, or may be attached via mechanical fasteners or via other attachment means know to those skilled in the art.

As described above, the third layer of material has an acoustic impedance of at least 41,000 Rayls, 7,000 Rayls, and 1,900 Rayls in the respective frequency ranges of 100–400 Hz, 500–2,000 Hz, and 2,500–5,000 Hz; has a sound absorption factor of at least 0.00, 0.001, and 0.13 in the respective frequency ranges of 100–400 Hz, 500–2000 Hz, and 2,500–5,000 Hz; and has a sound transmission loss of at least 1.9 dB, 1.5 dB, and 1.7 dB in the respective frequency ranges of 100–400 Hz, 500–2000 Hz, and 2,500–5,000 Hz.

Porous upholstery material, such as carpeting, is then attached to a surface of the third layer of material in face-to-face contacting relationship therewith (Block 130). In the case of carpeting, the backing side of the carpeting is attached to the surface of the third layer of material. Various additional operations may be performed on the composite article including molding operations, trim operations, etc.

Composite articles according to embodiments of the present invention can be "tuned" to provide desired sound attenuating characteristics in selected vehicle locations, such as floor pans, door panels, etc. The term "tuned" means that portions of a composite article can be formed to have a specific acoustic impedance designed to attenuate sound in one or more frequencies or frequency bands. Moreover, sound attenuating composite articles according to embodiments of the present invention may have reduced overall weight compared with conventional sound proofing materials, and without sacrificing sound attenuation properties.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A sound attenuating composite article for use within a vehicle, comprising:
    a damping layer having a thickness of less than or equal to about five millimeters (5 mm);
    a decoupler layer attached to a surface of the damping layer in face-to-face contacting relationship therewith, wherein the decoupler layer has a thickness of less than or equal to about seventy millimeters (70 mm);
    a third layer of material attached to a surface of the decoupler layer in face-to-face contacting relationship therewith, wherein the third layer comprises micro denier fibrous material and has a thickness of less than or equal to about two millimeters (2 mm); and
    a porous upholstery material attached to a surface of the third layer of material in face-to-face contacting relationship therewith;
    wherein the composite article has an acoustic impedance of at least 4,700 Rayls, 1,300 Rayls, and 950 Rayls in the respective frequency ranges of 100–400 Hz, 500–2,000 Hz, and 2,500–5,000 Hz.

2. The composite article of claim 1, wherein the composite article has a sound absorption factor of at least 0.13, 0.55, and 0.69 in the respective frequency ranges of 100–400 Hz, 500–2,000 Hz, and 2,500–5,000 Hz.

3. The composite article of claim 1, wherein the composite article has a sound transmission loss of at least 7.3 dB, 6.6 dB, and 8.0 dB in the respective frequency ranges of 100–400 Hz, 500–2,000 Hz, and 2,500–5,000 Hz.

4. The composite article of claim 1, wherein the damping layer comprises bituminous material.

5. The composite article of claim 1, wherein the decoupler layer comprises an acoustic fiber batting.

6. The composite article of claim 1, wherein the third layer of material comprises a blend of at least about 70% polyester fibers and at least about 10% polyolefin fibers.

7. The composite article of claim 1, wherein the third layer of material has a density of between about one thousand grams per square meter and about one thousand five hundred grams per square meter (1,000–1,500 g/m$^2$).

8. The composite article of claim 1, wherein the third layer of material has an acoustic impedance of at least 41,000 Rayls, 7,000 Rayls, and 1,900 Rayls in the respective frequency ranges of 100–400 Hz, 500–2,000 Hz, and 2,500–5,000 Hz.

9. The composite article of claim 1, wherein the third layer of material has a sound absorption factor of at least 0.00, 0.001, and 0.13 in the respective frequency ranges of 100–400 Hz, 500–2,000 Hz, and 2,500–5,000 Hz.

10. The composite article of claim 1, wherein the third layer of material has a sound transmission loss of at least 1.9 dB, 1.5 dB, and 1.7 dB in the respective frequency ranges of 100–400 Hz, 500–2,000 Hz, and 2,500–5,000 Hz.

11. The composite article of claim 1, wherein the third layer of material comprises polyethylene terephthalate (PET).

12. The composite article of claim 1, wherein the third layer of material comprises shoddy.

13. A sound attenuating composite article for use within a vehicle, comprising:
    a damping layer having a thickness of less than or equal to about five millimeters (5 mm);
    a decoupler layer attached to a surface of the damping layer in face-to-face contacting relationship therewith, wherein the decoupler layer has a thickness of less than or equal to about seventy millimeters (70 mm);
    a third layer of material attached to a surface of the decoupler layer in face-to-face contacting relationship therewith, wherein the third layer comprises micro denier fibrous material and has a thickness of less than or equal to about two millimeters (2 mm); and
    a porous upholstery material attached to a surface of the third layer of material in face-to-face contacting relationship therewith;
    wherein the composite article has an acoustic impedance of at least 4,700 Rayls, 1,300 Rayls, and 950 Rayls in the respective frequency ranges of 100–400 Hz, 500–2,000 Hz, and 2,500–5,000 Hz;
    wherein the composite article has a sound absorption factor of at least 0.13, 0.55, and 0.69 in the respective frequency ranges of 100–400 Hz, 500–2,000 Hz, and 2,500–5,000 Hz; and
    wherein the composite article has a sound transmission loss of at least 7.3 dB, 6.6 dB, and 8.0 dB in the respective frequency ranges of 100–400 Hz, 500–2,000 Hz, and 2,500–5,000 Hz.

14. The composite article of claim 13, wherein the damping layer comprises material selected from the group consisting of asphalt, natural polymers, synthetic polymers, and mixtures thereof.

15. The composite article of claim 13, wherein the decoupler layer of material comprises an acoustic fiber batting.

16. The composite article of claim 13, wherein the third layer of material comprises a blend of at least about 70% polyester fibers and at least about 10% polyolefin fibers.

17. The composite article of claim 13, wherein the third layer of material has a density of between about one thousand grams per square meter and about one thousand five hundred grams per square meter (1,000–1,500 g/m$^2$).

18. A vehicle floor covering that attenuates noise, comprising:
- a damping layer having a thickness of less than or equal to about five millimeters (5 mm);
- a decoupler layer attached to a surface of the damping layer in face-to-face contacting relationship therewith, wherein the decoupler layer has a thickness of less than or equal to about seventy millimeters (70 mm);
- a third layer of material attached to a surface of the decoupler layer of material in face-to-face contacting relationship therewith, wherein the third layer comprises micro denier fibrous material and has a thickness of less than or equal to about two millimeters (2 mm); and
- porous carpeting comprising a fabric side and an opposite backing side, and wherein the backing side is attached to the surface of the third layer of material in face-to-face contacting relationship therewith;
- wherein the composite article has an acoustic impedance of at least 4,700 Rayls, 1,300 Rayls, and 950 Rayls in the respective frequency ranges of 100–400 Hz, 500–2,000 Hz, and 2,500–5,000 Hz.

19. The vehicle floor covering of claim 18, wherein the composite article has a sound absorption factor of at least 0.13, 0.55, and 0.69 in the respective frequency ranges of 100–400 Hz, 500–2,000 Hz, and 2,500–5,000 Hz.

20. The vehicle floor covering of claim 18, wherein the composite article has a sound transmission loss of at least 7.3 dB, 6.6 dB, and 8.0 dB in the respective frequency ranges of 100–400 Hz, 500–2,000 Hz, and 2,500–5,000 Hz.

21. The vehicle floor covering of claim 18, wherein the damping layer comprises bituminous material.

22. The vehicle floor covering of claim 18, wherein the decoupler layer comprises an acoustic fiber batting.

23. The vehicle floor covering of claim 18, wherein the third layer of material comprises a blend of at least about 70% polyester fibers and at least about 10% polyolefin fibers.

24. The vehicle floor covering of claim 18, wherein the third layer of material has a density of between about one thousand grams per square meter and about one thousand five hundred grams per square meter (1,000–1,500 g/m$^2$).

25. The vehicle floor covering of claim 18, wherein the third layer of material has an acoustic impedance of at least 41,000 Rayls, 7,000 Rayls, and 1,900 Rayls in the respective frequency ranges of 100–400 Hz, 500–2,000 Hz, and 2,500–5,000 Hz.

26. The vehicle floor covering of claim 18, wherein the third layer of material has a sound absorption factor of at least 0.00, 0.001, and 0.13 in the respective frequency ranges of 100–400 Hz, 500–2,000 Hz, and 2,500–5,000 Hz.

27. The vehicle floor covering of claim 18, wherein the third layer of material has a sound transmission loss of at least 1.9 dB, 1.5 dB, and 1.7 dB in the respective frequency ranges of 100–400 Hz, 500–2,000 Hz, and 2,500–5,000 Hz.

28. The vehicle floor covering of claim 18, wherein the third layer of material comprises polyethylene terephthalate (PET).

29. The vehicle floor covering of claim 18, wherein the third layer of material comprises shoddy.

30. A vehicle floor covering that attenuates noise, comprising:
- a damping layer having a thickness of less than or equal to about five millimeters (5 mm);
- a decoupler layer attached to a surface of the damping layer in face-to-face contacting relationship therewith, wherein the decoupler layer has a thickness of less than or equal to about seventy millimeters (70 mm);
- a third layer of material attached to a surface of the decoupler layer in face-to-face contacting relationship therewith, wherein the third layer comprises micro denier fibrous material and has a thickness of less than or equal to about two millimeters (2 mm); and
- porous carpeting comprising a fabric side and an opposite backing side, and wherein the backing side is attached to the surface of the third layer of material in face-to-face contacting relationship therewith;
- wherein the composite article has an acoustic impedance of at least 4,700 Rayls, 1,300 Rayls, and 950 Rayls in the respective frequency ranges of 100–400 Hz, 500–2,000 Hz, and 2,500–5,000 Hz;
- wherein the composite article has a sound absorption factor of at least 0.13, 0.55, and 0.69 in the respective frequency ranges of 100–400 Hz, 500–2,000 Hz, and 2,500–5,000 Hz; and
- wherein the composite article has a sound transmission loss of at least 7.3 dB, 6.6 dB, and 8.0 dB in the respective frequency ranges of 100–400 Hz, 500–2,000 Hz, and 2,500–5,000 Hz.

31. The vehicle floor covering of claim 30, wherein the damping layer comprises bituminous material.

32. The vehicle floor covering of claim 30, wherein the decoupler layer comprises an acoustic fiber batting.

33. The vehicle floor covering of claim 30, wherein the third layer of material comprises a blend of at least about 70% polyester fibers and at least about 10% polyolefin fibers.

34. The vehicle floor covering of claim 30, wherein the third layer of material has a density of between about one thousand grams per square meter and about one thousand five hundred grams per square meter (1,000–1,500 g/m$^2$).

35. A vehicle, comprising:
- a panel;
- a damping layer attached to a surface of the panel in face-to-face contacting relationship therewith, wherein the damping layer has a thickness of less than or equal to about five millimeters (5 mm);
- a decoupler layer attached to a surface of the damping layer in face-to-face contacting relationship therewith, wherein the decoupler layer has a thickness of less than or equal to about seventy millimeters (70 mm);
- a third layer of material attached to a surface of the decoupler layer of material in face-to-face contacting relationship therewith, wherein the third layer comprises micro denier fibrous material and has a thickness of less than or equal to about two millimeters (2 mm); and
- a porous upholstery material attached to a surface of the third layer of material in face-to-face contacting relationship therewith;
- wherein the damping layer, decoupler layer, and third layer of material have a combined acoustic impedance of at least 4,700 Rayls, 1,300 Rayls, and 950 Rayls in the respective frequency ranges of 100–400 Hz, 500–2,000 Hz, and 2,500–5,000 Hz.

36. The vehicle of claim 35, wherein the damping layer, decoupler layer, and third layer of material have a combined sound absorption factor of at least 0.13, 0.55, and 0.69 in the respective frequency ranges of 100–400 Hz, 500–2,000 Hz, and 2,500–5,000 Hz.

37. The vehicle of claim 35, wherein the damping layer, decoupler layer, and third layer of material have a combined sound transmission loss of at least 7.3 dB, 6.6 dB, and 8.0 dB in the respective frequency ranges of 100–400 Hz, 500–2,000 Hz, and 2,500–5,000 Hz.

38. The vehicle of claim 35, wherein the damping layer comprises bituminous material.

39. The vehicle of claim 35, wherein the decoupler layer comprises an acoustic fiber batting.

40. The vehicle of claim 37, wherein the third layer of material comprises a blend of at least about 70% polyester fibers and at least about 10% polyolefin fibers.

41. The vehicle of claim 35, wherein the third layer of material has a density of between about one thousand grams per square meter and about one thousand five hundred grams per square meter (1,000–1,500 g/m$^2$).

42. The vehicle of claim 35, wherein the porous upholstery material comprises porous carpeting, wherein the carpeting comprises a fabric side and an opposite backing side, and wherein the backing side is attached to the surface of the third layer of material in face-to-face contacting relationship therewith.

43. The vehicle of claim 35, wherein the third layer of material comprises polyethylene terephthalate (PET).

44. The vehicle of claim 35, wherein the third layer of material comprises shoddy.

45. The vehicle of claim 35, wherein the panel comprises sheet metal.

46. A method of producing a sound attenuating composite article, comprising providing a damping layer having a thickness of less than or equal to about five millimeters (5 mm);

attaching a decoupler layer to a surface of the damping layer in face-to-face contacting relationship therewith, wherein the decoupler layer has a thickness of less than or equal to about seventy millimeters (70 mm);

attaching a third layer of material to a surface of the decoupler layer in face-to-face contacting relationship therewith, wherein the third layer comprises micro denier fibrous material and has a thickness of less than or equal to about two millimeters (2 mm); and attaching a porous upholstery material to a surface of the third layer of material in face-to-face contacting relationship therewith;

wherein the composite article has an acoustic impedance of at least 4,700 Rayls, 1,300 Rayls, and 950 Rayls in the respective frequency ranges of 100–400 Hz, 500–2,000 Hz, and 2,500–5,000 Hz, wherein the composite article has a sound absorption factor of at least 0.13, 0.55, and 0.69 in the respective frequency ranges of 100–400 Hz, 500–2,000 Hz, and 2,500–5,000 Hz, and wherein the composite article has a sound transmission loss of at least 7.3 dB, 6.6 dB, and 8.0 dB in the respective frequency ranges of 100–400 Hz, 500–2,000 Hz, and 2,500–5,000 Hz.

47. The method of claim 46, wherein the damping layer comprises bituminous material.

48. The method of claim 46, wherein the decoupler layer comprises an acoustic fiber batting.

49. The method of claim 46, wherein the third layer of material comprises a blend of at least about 70% polyester fibers and at least about 10% polyolefin fibers.

50. The method of claim 46, wherein the third layer of material has a density of between about one thousand grams per square meter and about one thousand five hundred grams per square meter (1,000–1,500 g/m$^2$).

51. The method of claim 46, wherein the porous upholstery material comprises porous carpeting, wherein the carpeting comprises a fabric side and an opposite backing side, and wherein the backing side is attached to the surface of the third layer of material in face-to-face contacting relationship therewith.

52. The composite article of claim 1, wherein the decoupler layer comprises an acoustic foam material.

53. The composite article of claim 13, wherein the decoupler layer of material comprises an acoustic foam material.

54. The vehicle floor covering of claim 18, wherein the decoupler layer comprises an acoustic foam material.

55. The vehicle floor covering of claim 30, wherein the decoupler layer comprises an acoustic foam material.

56. The vehicle of claim 35, wherein the decoupler layer comprises an acoustic foam material.

57. The method of claim 46, wherein the decoupler layer comprises an acoustic foam material.

* * * * *